United States Patent [19]

Ostrager

[11] 3,724,087

[45] Apr. 3, 1973

[54] SPIRIT LEVEL WITH TRANSLUCENT SPIRIT VIAL HOUSINGS

[76] Inventor: Seymour A. Ostrager, 1188 Grand Concourse, Bronx, N.Y.

[22] Filed: Oct. 26, 1970

[21] Appl. No.: 84,040

[52] U.S. Cl. .....................33/348, 33/383, 33/384
[51] Int. Cl. ............................G01c 9/32, G01c 9/30
[58] Field of Search.................33/211, 207, 213, 214

[56] References Cited

UNITED STATES PATENTS

| | | | |
|---|---|---|---|
| 1,784,550 | 12/1930 | Sinner | 33/207 |
| 2,750,677 | 6/1956 | Wirth | 33/211 |
| 1,177,131 | 3/1916 | Neidl | 33/214 |
| 3,071,863 | 1/1963 | MacMillan | 33/214 |
| 1,435,365 | 11/1922 | Zieman | 33/213 |
| 2,727,314 | 12/1955 | Dossie | 33/211 |
| 3,088,216 | 5/1963 | Jesonis | 33/211 |
| 2,502,235 | 3/1950 | Schultes | 33/213 |
| 3,435,533 | 4/1969 | Whitfield | 33/211 |
| 1,908,496 | 5/1933 | Hunter | 33/211 |

Primary Examiner—Leonard Forman
Assistant Examiner—Dennis A. Dearing
Attorney—Caesar, Rivise, Bernstein & Cohen

[57] ABSTRACT

A spirit level of elongated structure for determining plumb and horizontal orientations having spirit vial units at longitudinally spaced intervals thereof is provided. The spirit level frame comprises an elongated channel having parallel side walls and a connecting web extending perpendicularly between the side walls. The side walls form a recess which is adapted to receive the spirit vial units. At least one of the spirit vial units has a pair of spirit vials disposed perpendicularly to each other to permit simultaneous reading of both spirit levels to determine plumb. The spirit vial unit has a translucent housing for maintaining the vials in the recess. The housing has a transparent window to enable simultaneous reading of both the vials from a lateral position. The remaining portion of the translucent housing facilitates ease of reading by providing additional light to the vials while preventing the viewer from confusing other structure within the housing with said vials.

9 Claims, 9 Drawing Figures

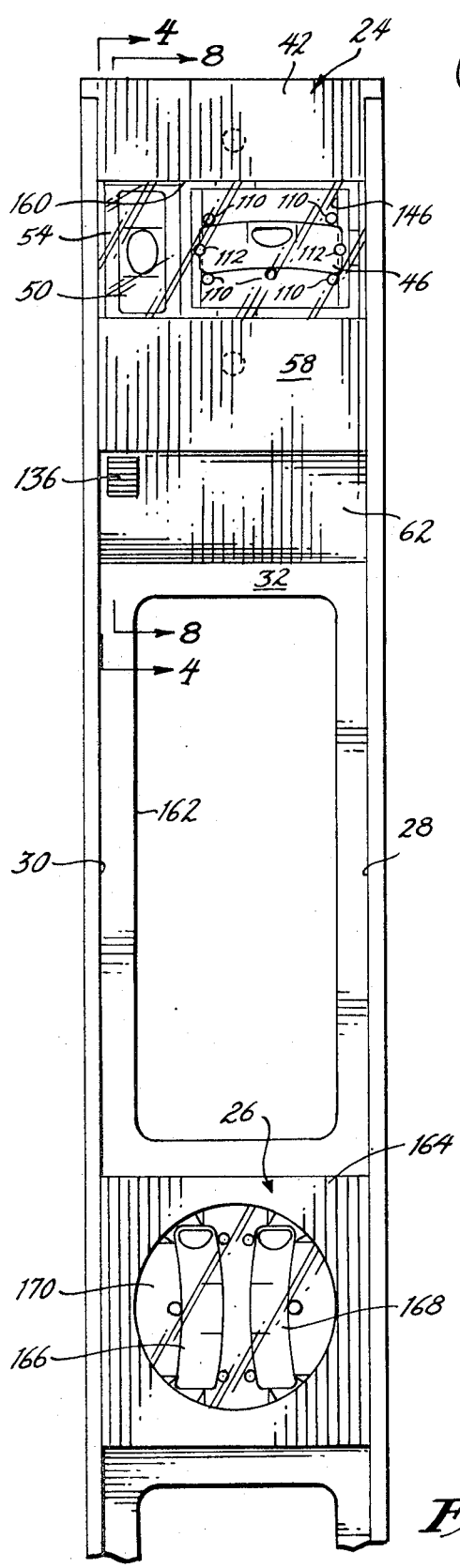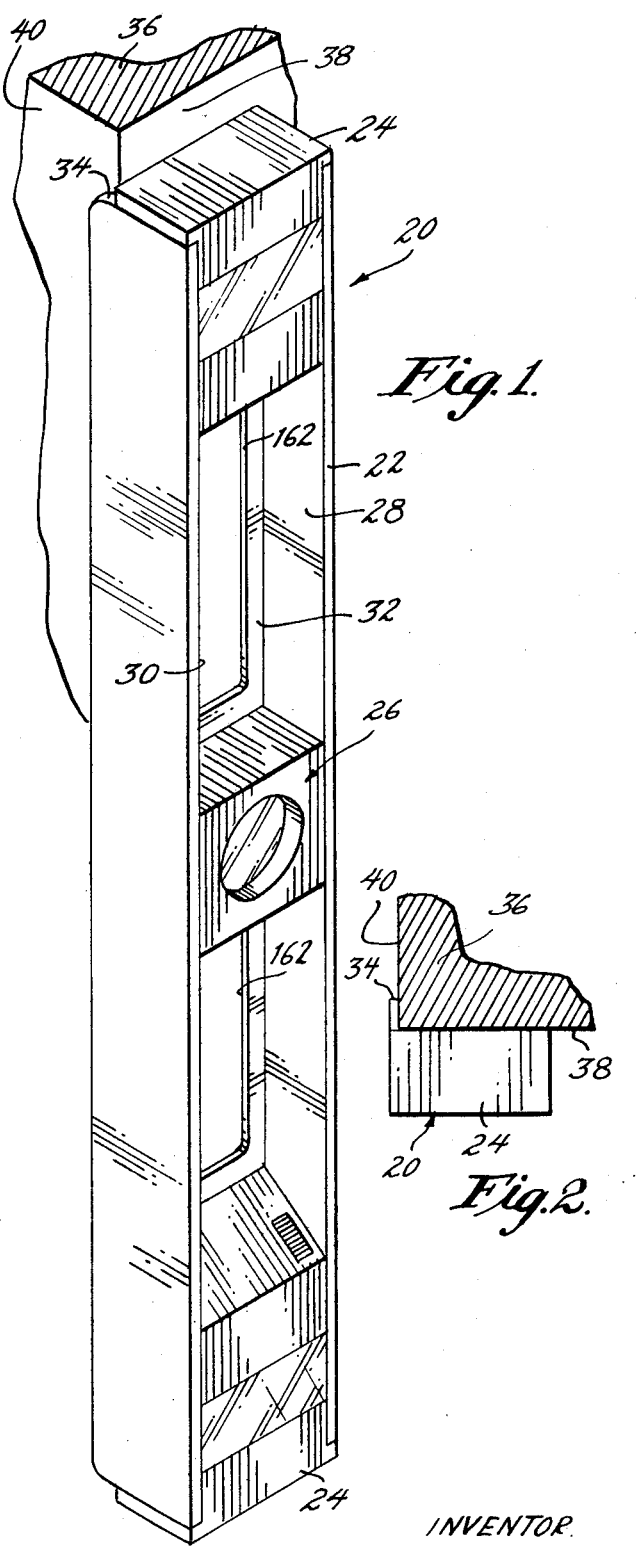

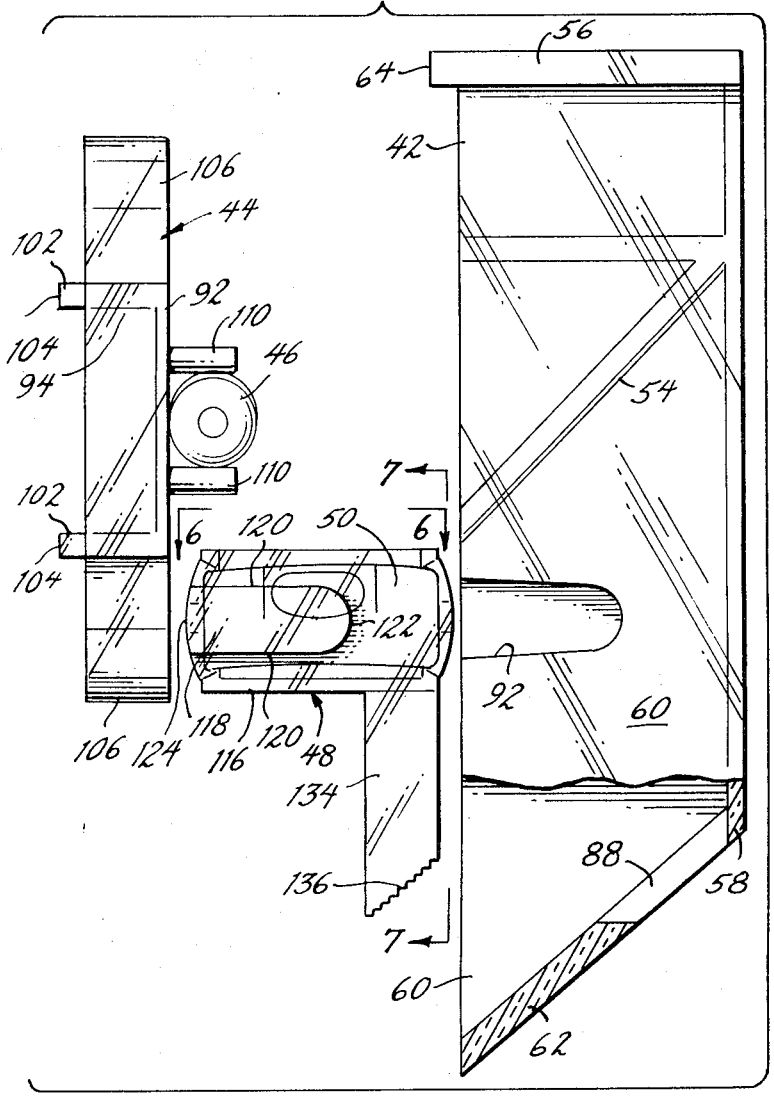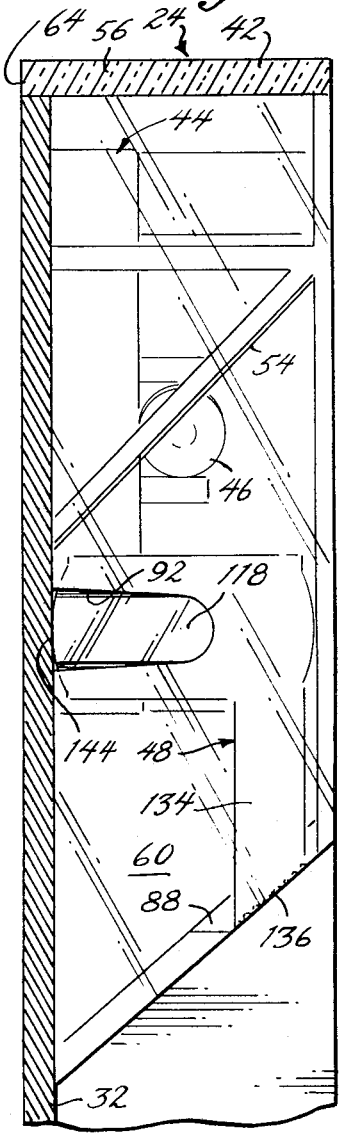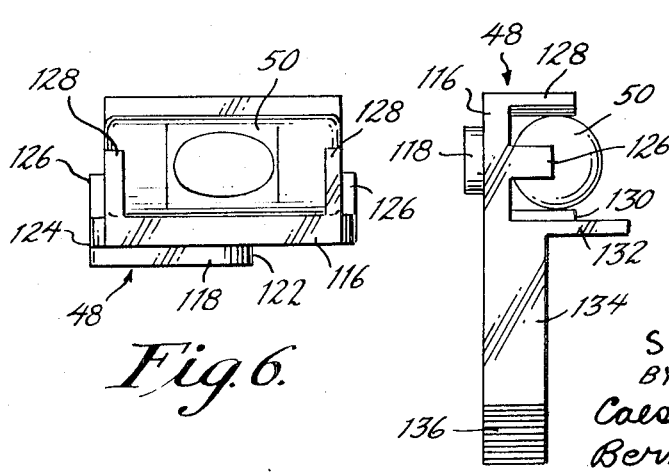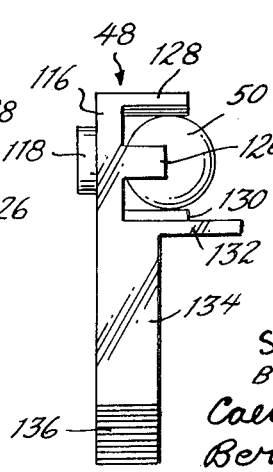

INVENTOR
SEYMOUR A. OSTRAGER
BY
Caesar, Rivise,
Bernstein & Cohen
ATTORNEYS.

3,724,087

SPIRIT LEVEL WITH TRANSLUCENT SPIRIT VIAL HOUSINGS

This invention relates generally to spirit levels and more particularly to a spirit level which includes spirit vial units to enable determination of plumb and at least one spirit vial unit for determining the horizontal orientation of a surface.

Conventional levels of elongated structure have, in the past, been inadequate since they were incapable of determining plumb with only one reading of the level. That is, the level was required to be placed against a first surface of an object which is desired to be disposed vertically and then after the object was made vertical in the first direction, the level was required to be placed at a disposition transverse to the first location of the level so that the verticalness of the object could be determined in a second orientation.

The Dossie U.S. Pat. No. 2,727,314 disclosed a combination spirit level and plumb which enables simultaneous reading of a pair of vials for the determination of plumb. However, the Dossie structure, while important for the concept it introduced, has never been feasible to produce commercially. The reason for the impracticality of the level shown in the Dossie patent is that the cost of imbedding spirit vials in a spirit level rail such as shown therein and the cost of accurately positioning the vials in the structure were prohibitive.

In my copending application Ser. No. 883,893, filed Dec. 10, 1969, there is disclosed a spirit level of elongated structure having spirit vial units for determining plumb wherein the frame of the level is of such simple channel construction that it can be produced by extrusion. The embodiment disclosed in the aforesaid copending application has brought down the cost of the item considerably because of the savings in the channel construction. However, the cost of producing the plumb spirit vial units had not been considerably reduced. Moreover, in dark corners, the spirit vials were difficult to read.

It is therefore an object of this invention to overcome the disadvantages found in the earlier inventions in this field and to provide a new and improved spirit level.

Another object of the invention is to provide a new and improved spirit level having spirit vial units mounted at longitudinally spaced intervals which are easily readable and easily accessible to the user thereof.

Another object of the invention is to provide a new and improved spirit level of elongated structure having spirit vial units which fit within recesses provided within the frame and are easily mounted therein.

Yet another object of the invention is to provide a new and improved spirit level of elongated structure wherein the housings for said spirit vial units are comprised of modular construction which are easily fitted together and provide adjustability for alignment of the vials with respect to the horizontal and vertical surfaces of the level frame.

Yet another object of the invention is to provide a new and improved spirit level wherein the spirit level housings are comprised of translucent material to enable increased light to strike the surface of said spirit vials to enable easier reading thereof.

These and other objects of the invention are achieved by providing a spirit level of elongated structure having spirit vial units at longitudinally spaced internals thereof. The spirit level frame comprises an elongated channel having parallel side walls and a connecting web extending perpendicularly between said side walls to form a recess which is adapted to receive the spirit vial units. At least one of the spirit vial units has a plurality of spirit vials disposed perpendicularly to each other to permit simultaneous reading of both spirit vials to determine plumb. The spirit vial unit has a translucent housing for maintaining the vials in the recess. The housing has a transparent window to enable simultaneous readings of both the housings from a lateral position. The translucent remainder of the housing facilitates ease of reading.

Other objects and many of the attendant advantages of this invention will be readily appreciated as the same becomes better understood by reference to the following detailed description when considered in connection with the accompanying drawings wherein:

FIG. 1 is a perspective view of a spirit level embodying the invention shown in use for determining the plumb of an object;

FIG. 2 is a top plan view of the spirit level in use;

FIG. 3 is an enlarged fragmentary front elevational view of the level;

FIG. 4 is an enlarged sectional view taken along the line 4—4 in FIG. 3;

FIG. 5 is an enlarged exploded side elevational view of the housing and spirit holding members to show the construction of the spirit vial unit embodying the invention;

FIG. 6 is an enlarged top plan view of a holder for one of the spirit vials taken along the line 6—6 in FIG. 5;

FIG. 7 is an enlarged front elevational view of the holder taken along the line 7—7 in FIG. 5;

Referring now in greater detail to the various figures of the drawing wherein like reference numerals refer to like parts, a spirit level with translucent spirit vial holdings is shown generally at 20 in FIG. 1.

Figures 8, 9:
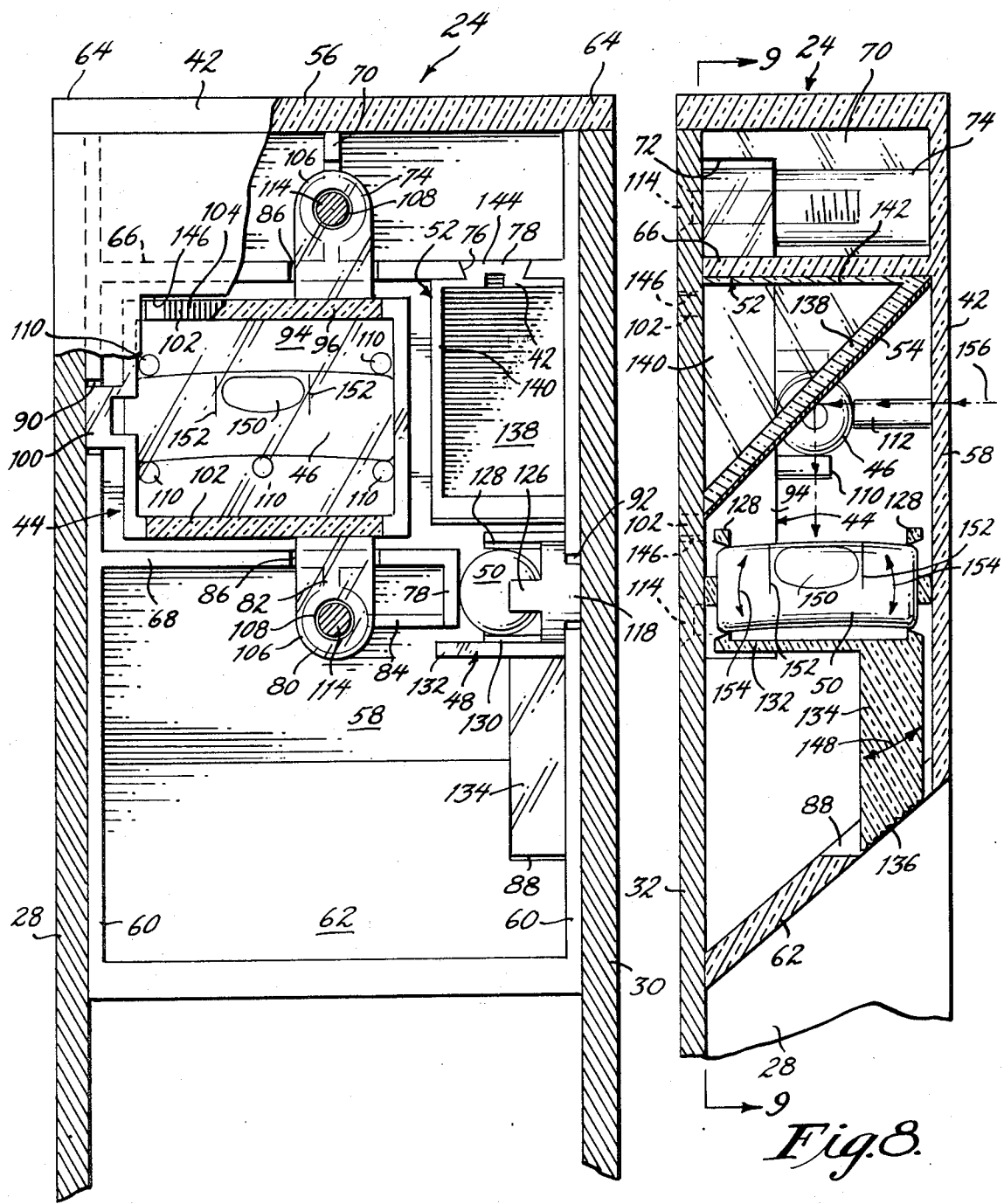
FIG. 8 is an enlarged sectional view taken along the line 8—8 in FIG. 3.
FIG. 9 is a sectional view taken along the line 9—9 in FIG. 8 with a fragmentary portion of the frame shown in elevation for purposes of clarity.

Spirit level 20 basically comprises a frame 22, a pair of similar spirit vial units 24 mounted at each end of the level for determining plumb and a spirit vial unit 26 which is preferably located at the center of the frame and is used for determining the horizontal orientation of the side walls of the frame 22.

Frame 22 is of elongated structure and is preferably comprised of extruded aluminum or aluminum alloy. Frame 22 is basically U-shaped in cross-section and includes a pair of side walls 28 and 30 and a thin connecting transversely extending web 32.

Side wall 30 includes a flange extension 34 which projects beyond the exposed surface of web 32. The angular surface of the wall formed by projection 34 and the outer surface of the web 32 is a right angle formed with respect to each other to provide the simultaneous gauging of two perpendicularly disposed vertical surfaces or horizontal and vertical surfaces depending upon the orientation of the elongated frame.

For example, as shown in FIGS. 1 and 2, a vertically extending object, such as a vertical standard, having a pair of planar vertically extending surfaces 38 and 40 which extend at right angles with respect to each other can be tested for plumb with spirit level 20. By placing the level 20 with the projection 34 against one of the vertical surfaces 40 and the outer surface of web 32 against the other of the vertical surfaces 38, the level 20 is enabled to determine plumb.

The spirit vial unit 24 which is at the upper end of the frame in the vertical disposition is utilized to determine plumb. As will be seen in greater detail hereinafter, the two spirit vials provided in the spirit vial units 24 are coincidentally viewed in order to determine the plumb. It should also be noted that the outer surface of web 32 may be placed against vertical surface 40 and projection 34 placed against surface 38 of the object 36 and the other of the spirit vial units is utilized to determine the plumb of object 36.

One of the spirit vial units 24 and the components thereof which are used to determine plumb are best seen in FIGS. 4 through 9. As seen therein, the spirit vial units 24 include a housing 42, a holder 44 for mounting a first spirit vial 46, a second holder 48 for mounting a second spirit vial 50, and a holder 52 for a mirror 54 which is secured thereto.

The housing 42 and holders 44, 48 and 52 are each preferably comprised of a clear or transparent high impact resistant thermoplastic such as Lexan. The outer surface of housing 42 is predominantly translucent as a result of having a corrugated texture so that it is not transparent from the outside looking in. The holders are transparent, however, to enable maximum light transmission through the various parts of unit 24 to aid in reading of the vials.

The housing 42 basically comprises a planar end wall 56, a planar front wall 58, a pair of planar side walls 60 and a diagonally extending end wall 62. As best seen in FIG. 4, the housing 42 fits within the recess of the frame 22 formed by walls 28 and 30 and web 32. The side walls 60 of the housing 42 fit snugly within the inner surfaces of walls 28 and 30.

The depth of the housing 42 is substantially equal to the depth of the recess formed between walls 28 and 30 and web 32 of the frame 22. Thus, the front wall 56 is substantially flush with the outermost edge of side walls 28 and 30 of the frame.

Front wall 58 and side wall 60 extend transversely to end wall 56 with walls 60 extending transversely to front wall 58. Thus, walls 60 and 58 form a U-shaped channel which is terminated normally at end wall 56 and diagonally at end wall 62.

End wall 56 includes a flange-like projection 64 which extends below the bottom of side wall 60 and laterally beyond side wall 60 so that, as seen in FIGS. 8 and 9, the end wall 56 is flush with the edges of side walls 28 and 30 and web 32 of the frame 22. Thus, projection 64 is U-shaped and extends around the sides and bottom of the spirit vial unit 24.

Spaced inwardly of and parallel to end wall 42 is a first mounting wall 66. Spaced further inwardly from mounting wall 66 and also parallel to wall 56 is a second mounting wall 68. Wall 66 extends transversely between side walls 60 of the spirit vial unit 24. A third mounting wall 70 extends transversely between mounting wall 66 and end wall 56.

As best seen in FIG. 8, mounting wall 70 includes a rectangular notch or opening 72 which, as will hereinafter be seen, accommodates holder 44. The wall 70 also includes an enlarged cylindrical portion 72 which includes an opening or bore which extends transversely to the front wall 58 of the spirit vial unit 24. The bore of enlarged cylindrical portion 74 of mounting wall 70 acts to receive a threaded fastener for securing the spirit vial unit 24 to the frame 22.

Mounting wall 66 also includes a rectangular slot 76 which extends parallel to wall 56 and which includes diagonally extending edges which flare outwardly towards end wall 56. Diagonal walls of the slot 76 act to receive a dovetail-shaped projection 78 of the mirror holder 52.

As best seen in FIG. 9, the mounting wall 68 extends from the left (as shown) side wall 60 of the spirit vial unit 24 to a point approximately two-thirds of the distance towards the right (as shown) side wall 60. The mounting wall 68 is terminated at a flange wall 78 which extends parallel to side wall 60 and transversely to mounting wall 68. A cylindrical projection 80 which extends transversely to the front wall 58 is connected to the walls 68 and 78 via a pair of intermediate walls 82 and 84. Wall 82 extends between the projection 80 and wall 68 parallel to wall 78 and intermediate wall 84 extends between projection 80 and wall 78 parallel to the wall 68.

Cylindrical projection 80 and end walls 82 and 84 extend to the same depth from the front wall 58 as does the cylindrical portion 74 of mounting wall 70. Mounting wall 66 and mounting wall 68 each include a notch or rectangular cut-out 86 which enables reception and/or accommodation of the holder 44.

As best seen in FIGS. 8 and 9, the diagonal end wall 62 includes a rectangular slot 88 which accommodates a portion of holder 48 to enable alignment of the vial 50 with respect to the frame 22.

The left side wall 60, as seen in FIG. 9, includes a rectangular notch or cut-out 90 which is utilized to accommodate holder 44. The right side wall 60, as seen in FIG. 9, includes a U-shaped slot 92 which is best seen in FIG. 4, and which is adapted to receive a projection on the holder 48 for vial 50.

Holder 44 is best seen in FIGS. 5 and 9 and basically comprises a rectangular planar base 94 having a peripheral skirt 96 which extends transversely to the base 94 around the entire periphery thereof and projects away from the front wall 58 of the spirit vial unit housing 42. One portion of skirt 96 includes a U-shaped projection 98 which includes a laterally extending projection or flange 100. As best seen in FIG. 5, the skirt 96 also includes a pair of elongated projections 102 which have knurled ends 104. As will hereinafter be seen, the projections 102 with the knurled ends 104 thereof act to enable alignment of the vial 46 with respect to the frame 22 of the level 20.

As best seen in FIG. 9, a pair of tabs 106 are provided on holder 44 which extends from opposite sides of skirt 96 in a lateral direction towards end walls 56 and 62. As best seen in FIG. 9, each of the tabs 106 includes an opening 108 which extends through the tabs 106 and accommodates passage of the securement means for fixing the spirit vial unit 24 to the frame 22.

Five generally cylindrical pins extend transversely to rectangular base 94 towards the front wall 58 of the housing 42 and in a direction opposite that of the skirt 96 with respect to the planar base 94. Pins 110 act to embrace and maintain the spirit vial 46 within the spirit vial unit 24. As best seen in FIG. 8, the housing 42 includes a pair of generally cylindrical pins 112 which extend transversely to the innermost surface of front wall 58 and abut at their free ends the side wall of the vial 46. Pins 110 and 112, thus, maintain vial 46 against base 94 in a fixed position within the housing 42 when the spirit vial unit 24 is secured within the frame 22.

As best seen in FIGS. 5 and 9, the holder 44 is assembled to the housing by laying the base 94 within the mounting walls 66 and 68 so that the tabs 106 extend through the cut-outs 86 in the walls 66 and 68 and flange 100 rests in the rectangular notch 90 in side wall 60. The openings 108 of the tabs 106 are also disposed over the bores of the cylindrical portion 74 of the wall 70 and cylindrical projection 80 so that threaded fasteners 114 can be passed through the openings 108 and secured in the bores of the cylindrical projection.

Holder 48 for spirit vial 50 in each of the spirit vial units 24 is best seen in FIGS. 5 and 9. Holder 48 basically comprises a generally rectangular planar base 116. On a first lateral surface of the base 116, a planar projection 118 is provided having a pair of straight edges 120 which are connected together by a semi-circular or arcuate edge 122. The projection 118 is elongated and is parallel to the outer surface of planar base 116 and extends in a direction generally parallel to vial 50. The projection 120 extends to and is terminated at an arcuate edge 124 which is coextensive with the edge of the planar base 116.

Extending from the opposite surface of the planar base 116 are a pair of projections 126 which extend transversely to the base 116 and which abut the ends of the spirit vials 50. A second pair of projections 128 which extends substantially parallel to projections 126 are provided for maintaining the spirit vial 50 against a third pair of projections 130 which are provided on the opposite lateral sides thereof.

The projections 130 are supported by a wall 132 which extends parallel to the projections 130 and transversely to the planar base 116. An arm 134 is also provided on the holder 48 which extends laterally of base 116 but parallel to the plane of base 116. Arm 134 includes a diagonally extending end or edge 136 which is best seen in FIG. 5 and FIG. 7 and is knurled. The knurled edge 136 projects into opening 88 of the diagonal wall 62 and enables the adjustment of the alignment of the vial 50 with respect to the frame 22.

As best seen in FIG. 9, when the holder 48 is assembled to the housing 42 of the spirit vial unit 24, the projection 118 fits within opening 92 of side wall 60 of housing 42. The arm 134 projects into opening 88 and the spirit vial 50 is maintained in place between the projections 128, 126, 130 and flange wall 78.

The mirror holder 52 is best seen in FIGS. 8 and 9. The holder 52 basically comprises a rectangular base 138 which has on one side thereof a triangular wall 140 and on one end thereof a rectangular wall 142. Wall 142 includes a dovetailed projection 144 which extends longitudinally thereof and, as set forth above, is adapted to fit in the slot 76 of wall 66. Base 138 is planar and extends transversely to the wall 140 and diagonally with respect to wall 142. On the other side of base 138, with respect to wall 140, a rectangular mirror 154 of the same size as base 138 is secured thereto by a suitable adhesive. The mirror holder 52 is secured to the housing 42 by pressing the dovetailed projection 142 within slot 76. The holder is maintained in place between the front wall 58 and the web 32 of the frame when the housing 42 is secured to the frame 22.

Each of the spirit vial units 24 provided at each end of the level frame 22 is identical and fits into the recess formed by the walls 28 and 30 and the web 32. The web 32 includes, as best seen in FIG. 4, a knurled surface at 144 adjacent and abutting the arcuate edge 124 of the projection 122 of holder 48 when the holder is disposed within slot 92 and unit 24 is assembled on the frame 22. It should be noted that the knurled surface 144 is provided on the web 32 of the level 20 adjacent each of the holders 48 in the two spirit level units 24.

As best seen in FIGS. 3 and 9, a rectangular opening 146 is provided below and adjacent to the spirit vial unit 46 in the web 32 at each end of the level. As best seen in FIGS. 8 and 9, the projections 102 of holder 44 extend through the opening 146 in the web to enable manual adjustment of the alignment of the vial 46 with respect to the level frame 22.

That is, referring to FIG. 5, after each of the holders 44 and 48 for the vials 46 and 50, respectively, and the holder 52 for the mirror are placed in the housing 42, fasteners 114 are threadedly engaged in the bores of the cylindrical portion 74 of wall 70 and the cylindrical projection 80. Just prior to the final turns of the fasteners 114 which tighten the fasteners for the final securement of the spirit vial unit 24 to the frame, arm 134 of holder 48 is rotatable in the direction of arrows 148 in order to enable alignment of the spirit vial 50 so that bubble 150 is between lines 152 of the vial 50 when the end wall 56 is horizontally oriented. That is, by rotation of arm 134 of the holder 48, the spirit vial 50 is rotated as indicated by arrows 154 in FIG. 8.

It should be noted that slot 92 in side wall 60, as best seen in FIG. 4, is wider than the projection 122 so that the edge 122 of the projection rotates within the arcuate end of slot 92. The extra width of the slot enables the rotation of the projection 118 with respect to the slot.

After the vial 50 has been oriented properly with respect to the frame, the orientation of vial 46 is checked with respect to the frame.

When the end wall 56 is horizontally oriented, the bubble 150 of vial 46 should be between lines 152. Thus, if the bubble 150 is not so oriented in vial 46, the projections 102 are engaged at the knurled surfaces thereof so that the holder 44 is manipulated until the bubble 150 is disposed within lines 152. It should be noted that the openings 108 in the tabs 106 are large enough with respect to the cross-section of the fasteners 114 that relative movement can be obtained. After each of the spirit vials 46 and 50 are disposed properly with respect to the frame, the fasteners 114 are tightened and the holders 44 and 48 are, thus, locked securely in place to prevent further rotation of the spirit vials 46 and 50 with respect to the frame.

The spirit vials 46 and 50 extend transversely with respect to each other so that, effectively, the vial 46 is utilized to determine the vertical orientation of the side walls 28 and 30 of the frame and the spirit vial 50 is utilized to determine the vertical disposition of the web 32 of the frame. Of course, when both spirit vials have their bubbles within lines 152, the level is vertically disposed.

Mirror 54, as best seen in FIG. 8, enables a lateral view of the spirit vial 50 by enabling the viewer to view the vial along the line of sight indicated by the arrows 156 therein. As best seen in FIG. 3, the front wall 58 includes a transparent portion or window 160 which acts as a window to enable viewing of both the spirit vials 46 and 50. It should be noted that the reflected image of vial 50 via mirror 54 enables the viewing of the spirit vial 50 simultaneously with the spirit vial 46. The remainder of the housing 24 is translucent only because of the corrugated texture of the outer surface of the spirit vial housing 42 about the window 160. As best seen in FIG. 1, the web 32 includes a pair of elongated rectangular openings 162 which are provided between each of the spirit vial units 24 and the spirit vial units 26.

The spirit vial unit 26 is preferably constructed as shown in my copending application Ser. No. 837,467 which was filed on June 30, 1969. The spirit vial unit 26 includes a housing 164 for a pair of spirit vials 166 and 168. The details of the construction of the housing and the holding units for the spirit vials 166 and 168 are shown in my aforementioned Application Serial No. 837,467. Both of the spirit vials 166 and 168 may be adjusted with respect to the side walls 28 and 30 of the frame 22.

Spirit vial 166 is utilized to determine the horizontal orientation of side wall 30 and spirit vial 168 is provided to determine the horizontal orientation of side wall 28. That is, when side wall 28 is provided on top of a horizontal surface, the vial 168 should have its bubble disposed within the lines and similarly when side wall 30 is placed on top of a horizontal surface, the bubble within vial 166 should be between the lines.

The housing 164 of spirit vial unit 26 is also made with a corrugated textured outer surface so that the housing is translucent about the periphery of the window 170 provided on each side of the spirit vial units 166 and 168.

The window 170 is transparent and one is provided on each side of the spirit vials 166 and 168. A circular opening is provided in the web 32 which is aligned with windows 170 and is the same size as the windows. The opening in the web 32 enables light to come through the other side to facilitate the reading of the spirit vials 166 and 168 as well as to enable the spirit vials to be read from both sides of the web 32.

The provision in the spirit vial units 24 of a translucent housing and transparent holders enables light to be transmitted readily through the housing and the various components holding the spirit vials so that maximum lighting is provided to the spirit vials to enable visibility thereof. The window 160 is provided in the spirit vial units only adjacent to the mirror 54 and spirit vial 46 and the remainder of the housing inhibits viewing of the various organization of components within the housing 42. Thus, the vials are not confused with the remaining components and readability of the spirit vials is, therefore, not difficult.

The knurled surface on the web 32 adjacent the projection 118 of holder 48 firmly secures the holder 48 against rotation by inadvertent brushing against the knurled surface 136 of arm 134 when the spirit vial unit has been firmly tightened to the frame 22.

The construction of the various holding units and the housing 42 of the spirit vial unit 24 also facilitates easy molding of the various portions and facilitates construction thereof and thereby additionally lowers costs in producing the spirit level embodying the invention by decreasing the time required for construction.

Without further elaboration, the foregoing will so fully illustrate my invention that others may, by applying current or future knowledge, readily adapt the same for use under various conditions of service.

What is claimed as the invention is:

1. In a spirit level of elongated structure having spirit vial units at longitudinally spaced intervals thereof, a spirit level frame comprising an elongated channel having parallel sidewalls and a connecting web extending perpendicularly between said sidewalls, said sidewalls forming a recess adapted to receive spirit vial units, at least one of said spirit vial units having a plurality of spirit vials disposed perpendicularly to each other to permit simultaneous reading of both spirit vials to determine plumb, each of said vials being mounted in a light transmissive holder, said holder including light transmissive means for adjusting said holder, said spirit vial unit having a translucent housing for maintaining said vials in said recess, said housing having a transparent window to enable simultaneous readings of both of said vials from a lateral position, said translucent remainder of said housing obscuring the holder and adjusting means for one of said vials, yet enabling sufficient light to enter said housing to facilitate ease of reading, said web including an opening through which means for adjusting the first of said spirit vials extends, said housing further including an opening to permit access to the means for adjusting the second of said spirit vials, said housing including an end wall which is mounted flush against the ends of said sidewalls and said connecting web.

2. In a spirit level of elongated structure, a spirit level frame comprising an elongated channel having parallel side walls and a connecting web extending perpendicularly between said side walls to receive a spirit vial unit, said spirit vial unit having a plurality of spirit vials disposed perpendicularly to each other to permit simultaneous readings of both spirit vials to determine plumb, a projecting member extending beyond the outer surface of said web and providing with said surface of the web at least one right angle corner, whereby adjacent surfaces of said web and projecting member are adapted for collective engagement with two perpendicularly disposed vertical surfaces and with adjacent perpendicularly disposed and vertical surfaces, said spirit vial unit including a housing and a pair of holders for said vials, said holders each being individually adjustable so that each vial is adjustable independently of the other of said vials, and a mirror, said mirror being mounted adjacent a first of said vials, said housing having a pair of side walls which are interposed between and abut said side walls of said frame, a first of said side walls having a slotted opening therein which extends transversely to the web of said frame, the holder for the first of said vials having a lateral projection for insertion in said slotted opening, said opening being larger than the width of said projection so that the disposition of said holder can be adjusted with respect to said frame.

3. The spirit level of claim 2 wherein the holder for the other of said vials includes a planar base having a pair of depending projections, said web of said frame having an opening for receiving said projections to enable adjustment of said holder for the other of said vials.

4. The spirit level of claim 2 wherein said holder for said first vial has an integral elongated arm terminated in a diagonal knurled edge, said housing having a diagonally extending end wall including an opening therein to accommodate the end of said arm so that said first vial is adjustable by manually engaging said knurled end.

5. The spirit level of claim 2 wherein the outer surface of said housing is translucent and includes a transparent window adjacent said vials.

6. The spirit level of claim 2 wherein said holders are transparent to facilitate transmission of light through said housing to said vials.

7. The spirit level of claim 2 wherein said spirit level includes a pair of said spirit vial units, said spirit vial units being provided on each end of said frame.

8. The spirit level of claim 7 wherein said spirit level further includes a spirit vial unit centrally located on said frame, said centrally located spirit vial unit including at least one vial for determining horizontal orientation of said spirit level frame.

9. The spirit level of claim 2 wherein said web includes a knurled surface adjacent said projection so that said holder is fixed between said knurled surface of said web and said slotted opening when said spirit vial unit is tightly secured to said frame.

* * * * *